Figure 1:
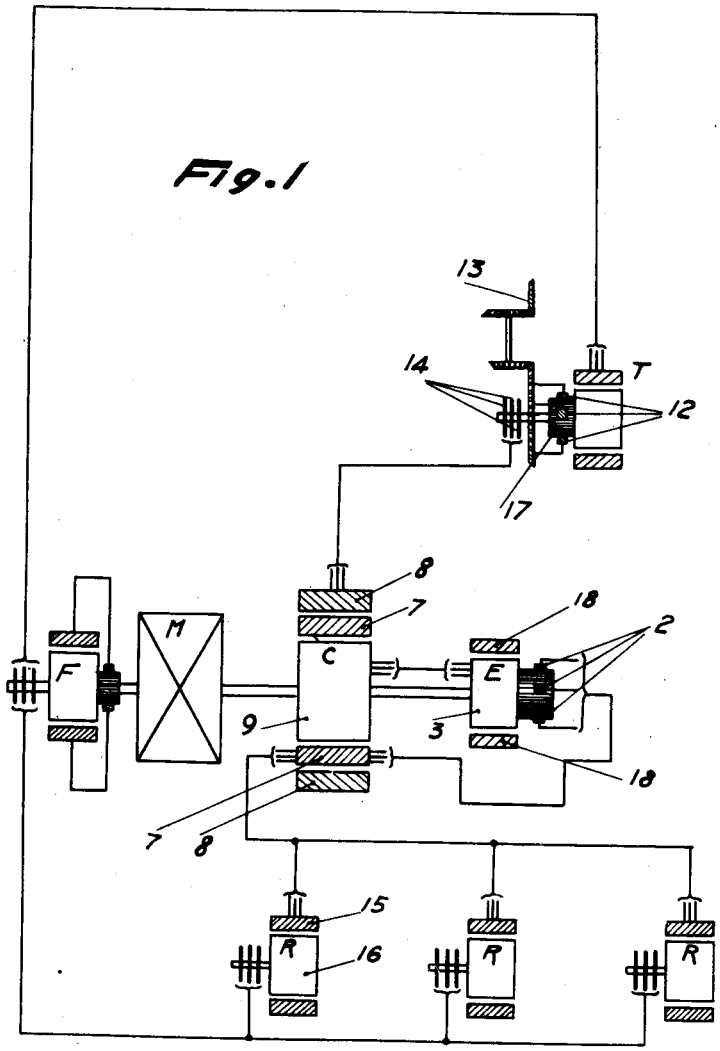

Feb. 23, 1937.  E. GRANAT  2,071,689
DISTANT TRANSMISSION OF ANGULAR MOVEMENTS
Filed May 1, 1936  2 Sheets-Sheet 1

E. Granat
INVENTOR
By Glascock Downing Seubold
Attys.

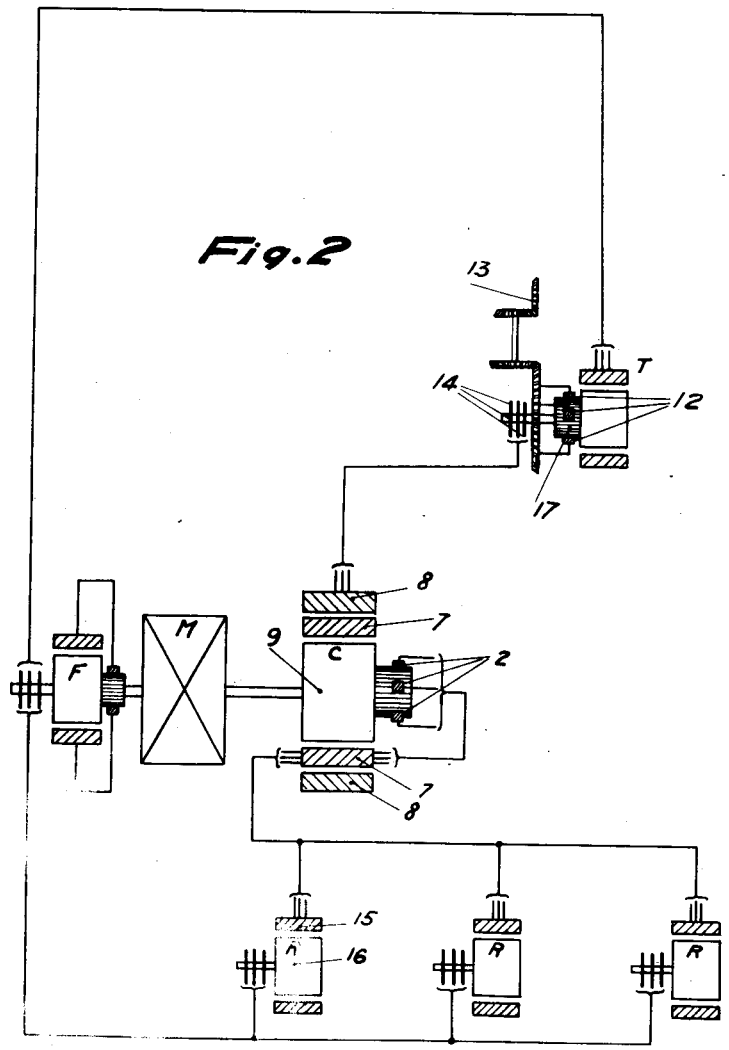

Patented Feb. 23, 1937

2,071,689

UNITED STATES PATENT OFFICE 2,071,689

DISTANT TRANSMISSION OF ANGULAR MOVEMENTS

Elie Granat, Paris, France, assignor of one-half to Compagnie des Forges et Acieries de la Marine et D'Homecourt, Paris, France, a French Company Application May 1, 1936, Serial No. 77,427
In France May 11, 1935

8 Claims. (Cl. 172—239)

My invention has for its object the distant transmission of angular movements to receivers comprising two windings which are fed respectively from two machines rotating at the same speed with a polyphase current of constant frequency Ω providing a rotary field of constant speed and with a polyphase current of variable frequency providing a field rotating at a speed which is the sum of the said constant speed and of the speed $w$ to be transmitted, latter speed being added preferably through the agency of an auxiliary transmitter providing the second or transmitter machine with an exciting current the frequency of which varies with the speed to be transmitted. The difference in rotary speed between the stator and rotor fields of the receivers being thus equal to the speed to be transmitted, the receivers will obviously be constrained to rotate at a speed equal to said speed to be transmitted.

Now, when the speed to be transmitted decreases or becomes zero, which corresponds to stopping, the currents flowing through the transmitter machine provided with a variable exciting field and through the receivers, which are limited solely by the impedance of the circuits, increase generally to a considerable extent and risk producing a dangerous heating. Remedy can be brought to this drawback by inserting in the leads feeding the receivers, resistances either constant or varying with the speed or else by making the feed voltage vary with the speed being transmitted.

Both above methods show certain drawbacks which may be removed by my invention. According to latter I obtain substantial constancy of currents and consequently of torques by adding a constant frequency value to that of the exciter current providing the variable rotary field in the main transmitter machine feeding the second windings of the receivers. If this constant added frequency value, which may advantageously be equal to that Ω fed to the first windings of the receivers, is large with reference to the frequency corresponding to the speed to be transmitted $w$, the variations of the latter will modify but little in relative value the frequency of the current flowing through the armature of the main transmitter and feeding the second receiver windings after passing through a frequency changer whereby the impedance of the variable frequency circuit remains substantially unaltered and the current flowing through it remains practically constant as well as the driving torque developed by the receivers.

Moreover the arrangement I have imagined allows the removal of the drawbacks due to the armature reaction in the main transmitter. I avoid the consequences of this armature reaction by compensating for the effects of the complementary induction thus provided by means of a second winding carried by the field piece and fed with a current of same frequency as and in phase opposition with the exciting current, said current being proportional to that fed by the main transmitter machine and being preferably constituted by the current passing out of the frequency changer.

Appended figures show by way of example two forms of execution of a distant control system to which the improvements I have imagined have been applied. Fig. 1 is a wiring diagram of the first form of execution and Fig. 2 is a similar diagram of the second form of execution which differs from the former by the inclusion of the frequency changer device in the main transmitter machine itself.

Referring to Fig. 1, the constant frequency exciting current of the main transmitter C driven at a constant speed Ω is fed from the machine F controlled by a shaft rotating preferably at the same constant speed Ω. The current thus fed from the machine F passes first into an auxiliary transmitter T in which there is added to the original frequency of said current a frequency $w$ equal to the value of the angular speed to be transmitted, this superimposition being performed by means of a set of brushes rotating at the said speed to be transmitted over the commutator of the auxiliary transmitter T. The current passing out of the main transmitter C at a frequency thus increased by Ω passes through a frequency changer E which reduces it to the desired useful value Ω+$w$ as explained hereinbelow. The frequency changer constituted by a machine with stationary brushes rubbing on its commutator rotates at the same speed Ω as the machine F and the transmitter C and feeds the receivers through the compensating winding of the transmitter C.

As apparent, the motor M drives both the main transmitter C which has no commutator and the machine F the constant direct exciting current of which is taken from its commutator. This machine F feeds with three-phase current and through electrically equidistant tappings the corresponding windings 16 of the receivers R. The excitation of the main transmitter C is provided to its field winding 8, in the case illustrated by the brushes 12 rotating at the speed to be transmitted $w$, under the action of the control part shown diagrammatically at 13 over the commutator 17 of the auxiliary static transmitter T and feeding said winding 8 through the rings 14 connected with equidistant electric tappings on said winding.

The primary of the auxiliary transmitter T is fed, as stated, with the same current of frequency $\Omega$ from the machine F which also feeds the receiver windings 16. The frequency of the current fed from the brushes 12 and feeding the field winding 8 is thus algebraically equal to $\Omega+w$, i. e. the frequency $w$ provided by the rotation of the brushes 12 increased by a constant basic frequency, which is $\Omega$ in the case considered. The frequency of the current fed by the armature of the main transmitter C which is excited thus with a frequency $\Omega+w$ and which rotates at a speed $\Omega$ is, for a suitable arrangement of the connections, $2\Omega+w$. In other words, the relative variations of the impedance in the armature 9 of the transmitter C are but small when $w$ varies. The current fed from equidistant tappings on the armature 9 feeds equidistant tappings on the rotor of the frequency changer E comprising a closed and stationary magnetic circuit 18. This frequency changer lowers the frequency by $\Omega$ and the transformed current of frequency $\Omega+w$ passes out of the rotor 9 of said frequency changer through the three stationary brushes 2 rubbing on its commutator. These brushes feed in their turn the stationary compensating winding 7 and the stator winding 15 of the receivers R in series with the latter. The number of coils of the compensating winding 7 through which current having the same frequency as the exciting current at 8 passes, should be suitably chosen with reference to the number of coils of the rotor 9 so as to ensure the perfect compensation required for the effects of the armature induction whatever the intensity of the current may be. In fact, as stated, this intensity does not vary considerably by reason of the substantially constant value of the impedance of the variable frequency circuits.

It should be noted that the rotors of the machines C and E can be formed into one; this is illustrated in Fig. 2 in which the part played by the magnetic circuit 18 of the frequency changer in Fig. 1 is played by the field piece 8 of the main transmitter. The phenomena which are divided between two machines C and E in the case of Fig. 1 are again performed in the same manner, but in a single machine. The rotor 9 of the main transmitter carries the frequency changer commutator 2 with three stationary brushes rubbing on it and behaving in the same manner as when they rub on the commutator of the independent frequency changer of Fig. 1.

What I claim is:

1. A system for distant electric transmission of angular speeds comprising a main transmitter machine including an armature and a field piece adapted to rotate at a constant speed one with reference to the other, means for exciting same with polyphase current having a frequency the value of which is proportional to that of the speed to be transmitted increased by a constant amount, at least one receiver including two windings adapted to rotate one with reference to the other, means for feeding the first receiver winding with a polyphase current of constant frequency, means for reducing the frequency of the current fed by the main transmitter by a second constant amount adapted to give it a value equal to that of the current feeding the first receiver winding increased by a value proportional to the speed to be transmitted and means for feeding the current thus reduced passing out of the last-mentioned means to the second receiver winding.

2. A system for distant electric transmission of angular speeds comprising a main transmitter machine including an armature and a field piece adapted to rotate at a constant speed one with reference to the other, means for exciting same with polyphase current having a frequency the value of which is proportional to that of the speed to be transmitted increased by a constant amount, at least one receiver including two windings adapted to rotate one with reference to the other, means for feeding the first receiver winding with a polyphase current of constant frequency, means for reducing the frequency of the current fed by the main transmitter by a second constant amount adapted to give it a value equal to that of the current feeding the first receiver winding increased by a value proportional to the speed to be transmitted, means for feeding the current thus reduced passing out of the last mentioned means to the second receiver winding and a compensating winding for the field piece of the main transmitter fed with current having the same frequency as and in opposite phase relationship with the exciting current in the said field piece and proportional to the intensity of said current.

3. A system for the distant electric transmission of angular speeds comprising a main transmitter including an armature and a stationary field piece, means for rotating the armature at constant speed, means for exciting the field piece with current having a frequency the value of which is proportional to that of the speed to be transmitted increased by the speed of the main transmitter armature, said current producing a field rotating in a direction opposed to the rotation of the armature, at least one receiver including two windings adapted to rotate one with reference to the other, means for feeding the first receiver with a current the frequency of which is proportional to the speed of the transmitter armature, a frequency changer adapted to reduce the frequency of the current fed by the main transmitter to an amount the value of which is equal to that of the exciting current frequency and means for feeding the current of thus reduced frequency passing out of the frequency changer to the second receiver winding.

4. A system for the distant electric transmission of angular speeds comprising a main transmitter including an armature and a stationary field piece, means for rotating the armature at constant speed, means for exciting the field piece with current having a frequency the value of which is proportional to that of the speed to be transmitted increased by the speed of the main transmitter armature, said current producing a field rotating in a direction opposed to the rotation of the armature, at least one receiver including two windings adapted to rotate one with reference to the other, means for feeding the first receiver with a current the frequency of which is proportional to the speed of the transmitter armature, a frequency changer adapted to reduce the frequency of the current fed by the main transmitter to an amount the value of which is equal to that of the exciting current frequency, means for feeding the current of thus reduced frequency passing out of the frequency changer to the second receiver winding and a compensating winding for the transmitter field piece inserted between the frequency changer and the second receiver winding and adapted to produce a field opposed in direction to the exciting field in said field piece.

5. A system for the distant electric transmission of angular speeds comprising a main transmitter including a field piece and an armature, a generator, a frequency changer, means for rotating said transmitter, generator and frequency changer at the same electric angular speed, an auxiliary transmitter fed by said generator, means rotating at the speed to be transmitted whereby the auxiliary transmitter adds to the frequency of the current fed to it a value equal to that of the speed to be transmitted, means whereby the auxiliary transmitter feeds current of thus increased frequency to the transmitter field piece to produce therein a field rotating in a direction opposed to that of the armature, at least one receiver including two windings adapted to rotate one with reference to the other and the first of which is fed by the generator, means whereby the frequency changer lowers the frequency of the current by an amount equal to that of the frequency of the current fed by the generator and means for feeding the current passing out of the frequency changer to the second receiver winding.

6. A system for the distant electric transmission of angular speeds comprising a main transmitter including a field piece, a generator of polyphase current, a motor rotating said transmitter and generator at the same electric angular speed, an auxiliary transmitter fed by said generator, means rotating at the speed to be transmitted for adding to the frequency of the current, fed to the auxiliary transmitter a value equal to that of the speed to be transmitted, means whereby the auxiliary transmitter feeds the current of thus increased frequency to the transmitter field piece to produce therein a field rotating in a direction opposed to that of the armature, at least one receiver including two windings adapted to rotate one with reference to the other and the first of which is fed by the generator, a stationary set of brushes rubbing on the transmitter armature commutator and means fed by said brushes and feeding the second receiver winding.

7. A system for the distant electric transmission of angular speeds comprising a main transmitter including a field piece and an armature, a generator, a frequency changer, means for rotating said transmitter, generator and frequency changer at the same electric angular speed, an auxiliary transmitter fed by said generator, means rotating at the speed to be transmitted whereby the auxiliary transmitter adds to the frequency of the current fed to it a value equal to that of the speed to be transmitted, means whereby the auxiliary transmitter feeds currents of thus increased frequency to the transmitter field piece to produce therein a field rotating in a direction opposed to that of the armature, at least one receiver including two windings adapted to rotate one with reference to the other and the first of which is fed by the generator, means whereby the frequency changer lowers the frequency of the current by an amount equal to that of the frequency of the current fed by the generator, means feeding the current passing out of the frequency changer to the second receiver winding, and a compensating winding for the transmitter field piece inserted in the means feeding the second receiver winding and adapted to produce a field opposed and proportional to the exciting field in said field piece.

8. A system for the distant electric transmission of angular speeds comprising a main transmitter including a field piece, a generator of polyphase current, a motor rotating said transmitter and generator at the same electric angular speed, an auxiliary transmitter fed by said generator, means rotating at the speed to be transmitted for adding to the frequency of the current, fed to the auxiliary transmitter a value equal to that of the speed to be transmitted, means whereby the auxiliary transmitter feeds the current of thus increased frequency to the transmitter field piece to produce therein a field rotating in a direction opposed to that of the armature, at least one receiver including two windings adapted to rotate one with reference to the other and the first of which is fed by the generator, a stationary set of brushes rubbing on the transmitter armature commutator, means fed by said brushes and feeding the second receiver winding and a compensating winding for the transmitter field piece inserted in the means feeding the second receiver winding and adapted to produce a field opposed and proportional to the exciting field in said field piece.

ELIE GRANAT.